United States Patent Office 3,204,365
Patented Sept. 7, 1965

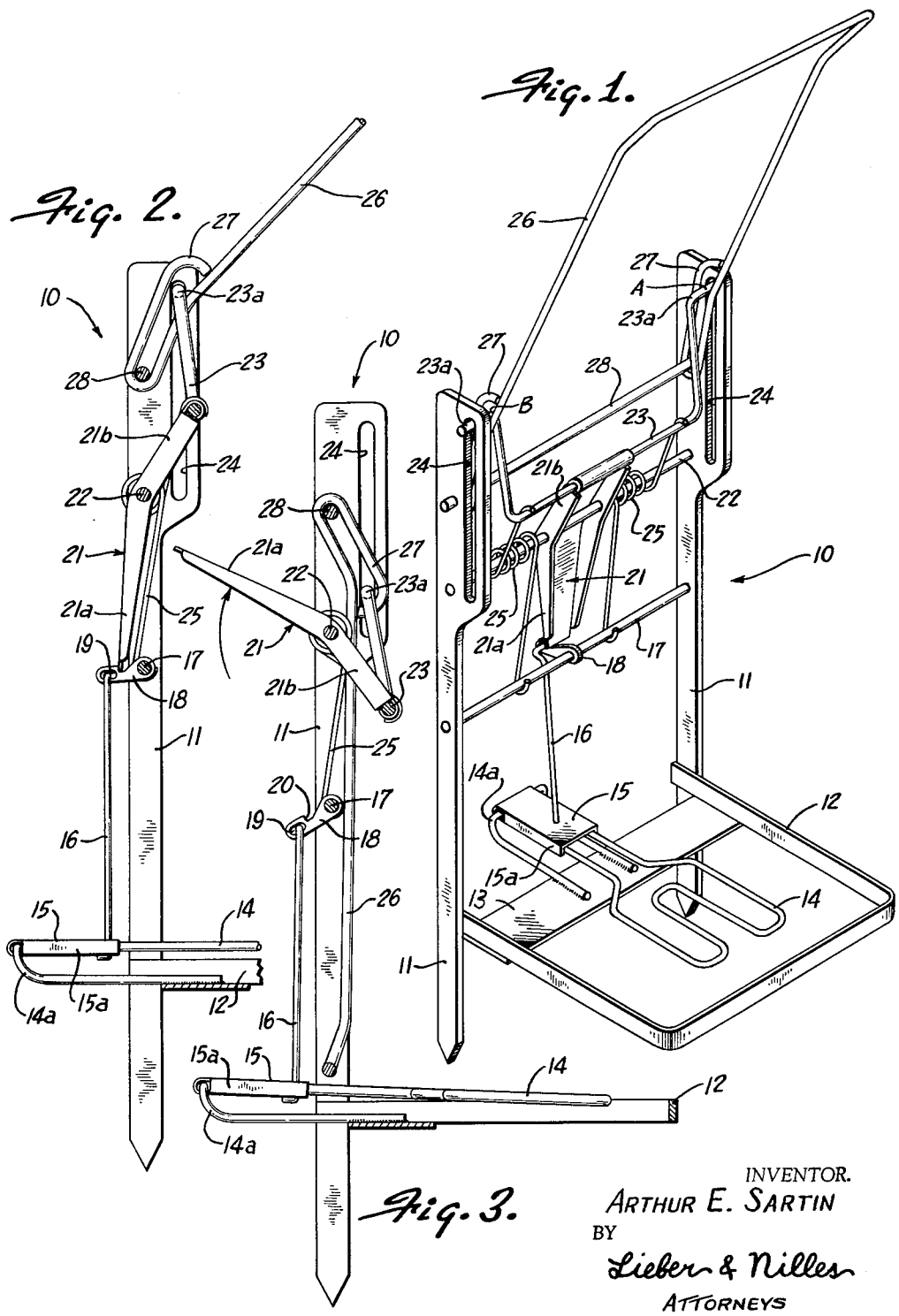

3,204,365
ANIMAL TRAP
Arthur E. Sartin, Fox River Grove, Ill., assignor of one-half to Roger C. Johnson, Muscatine, Iowa
Filed May 28, 1964, Ser. No. 370,778
9 Claims. (Cl. 43—81)

This invention relates to animal traps, and more particularly to improvements in animal traps of the type known as killer traps.

A primary object of the invention is to provide an improved animal trap which is simple in construction and extremely efficient in operation and use.

Numerous prior art traps utilize a pair of jaws that are closed and locked upon the leg of an animal through the coaction of springs and appropriate linkage. In some instances, a third jaw is provided and is tripped by movement of the animal to hold the caught leg in an extended position to prevent the animal from twisting or severing the caught leg. Other traps, characterized as killer traps, depend on an animal walking or swimming through a set of jaws to trip a trap trigger mechanism. Such killer traps have certain disadvantages in that fur-bearing animals are reluctant to enter or pass through a structure that is not familiar to them, and the animals may not strike the triggering mechanism with sufficient force to release the jaws of the trap. Such a trap, for example, is disclosed in De Vorsey U.S. Patent No. 2,562,417, issued July 31, 1951.

Another killer trap is disclosed in Cosey U.S. Patent No. 2,712,707, issued July 12, 1955, and provides a striker for striking an animal when the animal contacts a trigger plate, and the striker actuates a hold-down mechanism to prevent the striker from being raised by the animal thereberneath. Thus, an elaborate, double-actuating means must be provided for striking and hold-down.

In the present invention, the disadvantages of the prior art structures are overcome by providing an improved spring and linkage for striking and retaining an animal in a trapped condition.

Another object of the invention is to provide an improved animal trap having an improved and effective striking and retaining means for animal entrapment.

It is another object of the invention to provide an improved animal trap wherein the trap operating mechanism is above the normal line of sight of an animal to be trapped while also being so oriented as to be essentially unaffected by climatic conditions such as snow and freezing rain.

It is a further object of the invention to provide an improved locking mechanism for an animal trap together with an improved trigger pan for an animal trap.

A still further object of the invention is to provide an improved striker jaw mechanism wherein the jaw is moved from a position substantially above the horizontal plane toward a vertically downwardly inclined position.

An additional object of the invention is to provide an improved animal trap wherein the operating structure and supporting frame therefor project appreciably above ground level and to one side of the intended path of an animal to be trapped.

These and other objects and advantages of the invention will become apparent from the following detailed description.

A clear conception of the several features constituting the present invention and mode of constructing same may be had by referring to the drawings accompanying and forming a part of this specification, wherein like reference characters designate the same or similar parts in the various views.

FIGURE 1 is a perspective view of the animal trap in set position;
FIGURE 2 is an elevational view of the trap of FIGURE 1; and
FIGURE 3 is an elevational view similar to that of FIGURE 1 showing the trap in a closed or "sprung" condition.

While the improvements have been illustrated and described as being especially advantageously embodied in a killer trap, it is not intended to thereby unnecessarily limit or restrict the invention. It is also contemplated that certain descriptive terminology used herein shall be given the broadest possible interpretation consistent with the disclosure.

Referring now to the drawings, an animal trap is designated generally by the numeral 10 which is provided with a pair of vertical frame members 11 in substantially parallel alignment secured together adjacent their lower ends by a horizontal base member 12.

A support plate 13 is secured to the base member 12 on which is mounted a trigger pan structure 14. The pan structure 14 of the preferred embodiment is formed of a length of wire 14a bent to the configuration shown in FIGURE 1 to which is attached a pan 15 having a flange portion 15a provided with an opening for pivotally receiving the wire member 14a which is, in turn secured to plate 13. The trigger pan structure is thus pivotally carried by wire member 14a. A connecting link 16 is secured to pan 15, and is moved when the pan structure 14 is depressed.

Thus, it can be seen that the pan structure 14 is of wire skeleton-type construction bent to be easily contacted by an animal wherein the weight or portion of the weight of an animal will cause the pan structure 14 to be depressed to pivot pan 15 downwardly (as viewed in the drawings) to position the connecting link 16 to allow the trap to be sprung as will be described hereinafter.

A pin 17 extends between frame members 11 and is secured thereto for pivotally supporting a sear 18, adapted to rotate about pin 17. The connecting link 16 is attached to sear 18 at aperture 19, and sear 18 is pivoted about pin 17 by the movement of link 16 when pan structure 14 is depressed by an animal to be trapped. The sear 18 is provided with a notch 20, into which a lever 21 is insertable for setting the trap.

The lever 21 is pivotally mounted on a pin 22 also extending between frame members 11 and substantially parallel and superadjacent pin 17.

The lever 21 comprises a lower part 21a for releasable engagement with notch 20 of sear 18 and an upper part 21b for pivotally engaging a sliding link 23. The sliding link 23 is substantially U-shaped and is provided with ends 23a which extend through elongated openings 24 in the upper portion of frame members 11.

A pair of springs 25 are carried on pin 22 wherein the ends of the springs 25 engage sliding link 23 and pin 17 to urge the link 23 in a downward direction (as viewed in the drawings). However, with lever 21 held in notch 20 of sear 18, the sliding link 23 will be prevented from moving downwardly.

The striker jaw 26 is, in the preferred embodiment, formed of a single piece of wire, wherein wire loops 27 are formed so that the jaw 26 is pivotally carried by a pin 28 extending between frame members 11, superadjacent and substantially parallel to pins 17 and 22. Further, the jaw 26 is interposed between sliding link 23 and frame members 11 wherein the jaw 26 in its upward position of FIGURE 1 holds sliding link 23 in an upper position. The link 23 is in engagement with jaw 26 at points A and B.

As the sear 18 is pivoted downwardly (see FIGURE 3), as by an animal stepping on the trigger 14, the lever 21 is released from notch 20 in a clockwise direction (FIGURE 3) as occasioned by the urging of springs 25. As lever 21 pivots clockwise about pin 22, the sliding link 23 is forced downwardly along elongated apertures 24, thereby pulling the jaw 26 forceably therewith to strike the animal to thereby effectively entrap the animal.

With the lever 21 and sliding link 23 in the position shown in FIGURE 3, the striker jaw 26 cannot be moved upwardly by the animal as the jaw 26 is in a locked position, and its counterclockwise positioning is prevented by jaw 26 being restrained from movement by sliding link 23.

However, the jaw may be easily moved to a "set" position as shown in FIGURE 1 by rotating lever 21 in a counterclockwise direction, as viewed in the drawings. Such rotation of lever 21 positions sliding link 23 upwardly within elongated apertures 24, and causes jaw 26 to move to its upward or "set" position. The setting of the trap is completed by rotating sear 18 until the lever 21 is retained within notch 20.

In using the trap 10, the pointed ends of frame members 11 are thrust into the ground, for example, so that the trap is maintained in a substantially upright position. The trap may be located along a path where animals are known or believed to pass with a plane passing through the frame members substantially parallel to and aligned with the path. As much of the operating mechanism is above the eye level of many animals, they may not notice the slender frame members and thus not avoid passing over the triggering device.

Further, the wire formed trigger device will not hold moisture or snow and thus will not be accidentally tripped by a collection of water and snow.

Thus an animal trap has been described whereby a simple, effective jaw actuating mechanism is provided that will positively strike an animal forcefully when the trigger device is depressed, and further an animal trap that is not readily discernible by an animal, and wherein a trigger device is provided that obviates the collection of moisture thereon, thus eliminating premature tripping of the trap from moisture collection or the like.

Further, the press of the jaw of the animal trap in trapping an animal is indirectly applied from torsion springs acting on a sliding link such that the closing force of the jaw increases near the end of its travel, and the force is not proportional to the force exerted by the springs as would be the case if the jaw was directly acted upon by the springs.

In addition, a trap has been described wherein the locking effect of the jaw is principally due to friction, sufficient to prevent vertical movement of the sliding link.

Various modes of carrying out the invention are contemplated as being within the scope of the following claims particularly pointing out and distinctly claiming the subject matter which is regarded as the invention.

I claim:

1. A killer trap comprising in combination, a supporting frame, a sear pivotally carried by said frame, a trigger device carried by said frame, a link interconnecting said trigger device and said sear for pivoting said sear when said trigger device is actuated by an animal or the like,
   said sear also provided with a notch therein adapted to receive and release a lever,
   a lever pivotally mounted on said frame for engagement with the notch of said sear for setting said trap,
   said supporting frame being provided with a pair of elongated apertures for receiving a sliding link positionable within said apertures,
   a sliding link pivotally connected to said lever and slidable within said elongated apertures,
   spring means engaging said sliding link to urge said sliding link downwardly of said elongated apertures,
   and a striker jaw pivotally carried by said supporting frame and actuatable by said sliding link when said sliding link is allowed to move downwardly by the pivoting of sear as occasioned by said tripping device.

2. A killer trap comprising in combination, a supporting frame, a sear pivotally carried by said frame, a trigger device carried by said frame, a link interconnecting said trigger device and said sear for pivoting said sear when said trigger device is actuated by an animal or the like,
   said sear also provided with a notch therein adapted to receive and release a lever,
   a lever pivotally mounted on said frame for engagement with the notch of said sear for setting said trap,
   said supporting frame being provided with a pair of elongated apertures for receiving a sliding link positionable within said apertures,
   a U-shaped sliding link pivotally connected to said lever and slidable within said elongated apertures,
   spring means carried coaxially of said lever pivotal mounting for urging said sliding link in a predetermined direction,
   and striking means pivotally carried by said supporting frame and provided with a sliding link engaging portion whereby said striking means is forceably spring actuated to entrapment position when said interconnecting link is moved from said sear notch by said actuation of said trigger device.

3. The trap of claim 1 wherein said trigger device comprises a wire member formed to present an animal contact surface, means secured to said wire member for providing a pivotal connection to said supporting frame, and said interconnecting link being attached to said means, whereby a depressing of said wire member pivots said sear to release said lever to spring the trap.

4. The trap of claim 1 wherein said striker jaw is formed from a wire member that is looped around a pin joining said supporting frame for allowing pivotal movement of said striker jaw, said wire member also looped to engage said sliding link so that said jaw is actuated by said spring urged sliding link when said lever is released from said sear upon pivotal movement of said sear by said interconnecting link as positioned by said trigger device.

5. An animal trap comprising in combination, a supporting frame, a trigger device pivotally carried by said frame at a lower portion thereof, a sear pivotally carried by said frame a predetermined distance from said trigger device, a link attached to said trigger device and to said sear for pivoting said sear when said link is positioned by the pivoting of said trigger device,
   a lever pivotally carried by said frame superadjacent said sear and releasably engageable with said sear,
   said supporting frame being provided with elongated aperture means for receiving a sliding link positionable within said elongated aperture means,
   a sliding link pivotally attached to said lever and slidable within said aperture means,
   spring means carried by said frame and engageable with said sliding link for urging said sliding link to slide within said elongated aperture means when said lever is released from engagement with said sear, and a striker jaw pivotally carried by said frame and engageable with said sliding link, whereby release of said lever from said sear by said trigger device urges said sliding link and striker jaw to move by spring action to entrap an animal between said jaw and said supporting frame.

6. The animal trap of claim 5 wherein said striker jaw and said sliding link are interconnected to thereby maintain said striker jaw in animal entrapment position by action of said spring means on said sliding link after pivoting of said sear by said trigger device.

7. The animal trap of claim 5 wherein said trigger device includes a skeletonized trigger pan pivotally secured to said supporting frame.

8. A killer trap comprising, a vertical main frame positionable laterally of an animal path, a sear carried by intermediate portion of said frame, a trigger pivotally carried by said frame below said sear and having its actuating portion extended laterally from said frame and transversely of the path to thus provide unobstructed access thereto, a jaw pivotally mounted on said frame above said sear, means constantly urging said jaw about its pivot downwardly toward and in approximate alignment with said frame, means interconnecting said trigger and said sear for actuating said sear upon actuation of said trigger, and means interposed between said sear and said jaw for cocking said jaw and holding the same in a cocked position wherein it projects upwardly away from said frame until said trigger is actuated to thereby release said jaw holding means from said sear.

9. A killer trap comprising, a vertical main frame positionable laterally on an animal path, a trigger pivotally carried by a lower portion of said frame and having its actuating portion extended laterally from said frame transversely of the path, a jaw pivotally mounted on an upper portion of said frame, means constantly urging said jaw about its pivot downwardly toward and in approximate vertical alignment with said frame, means interposed between said trigger and said jaw for cocking said jaw and holding the same in an upwardly directed position entirely above said trigger until said trigger is actuated to thereby release said jaw holding means.

References Cited by the Examiner
UNITED STATES PATENTS 1,455,131  5/23  Ziola _____ 43—81 X
1,466,102  8/23  Proctor _____ 43—81

SAMUEL KOREN, *Primary Examiner.*